A. P. MYERS.
Milk-Cooler.

No. 161,979.   Patented April 13, 1875.

WITNESSES:   INVENTOR:
E. Wolff   A. P. Myers
   BY
   ATTORNEYS.

THE GRAPHIC CO.PHOTO-LITH.39 & 41 PARK PLACE,N.Y.

UNITED STATES PATENT OFFICE.

ADDISON P. MYERS, OF PRATTSVILLE, NEW YORK.

IMPROVEMENT IN MILK-COOLERS.

Specification forming part of Letters Patent No. 161,979, dated April 13, 1875; application filed March 13, 1875.

*To all whom it may concern:*

Figure 1:
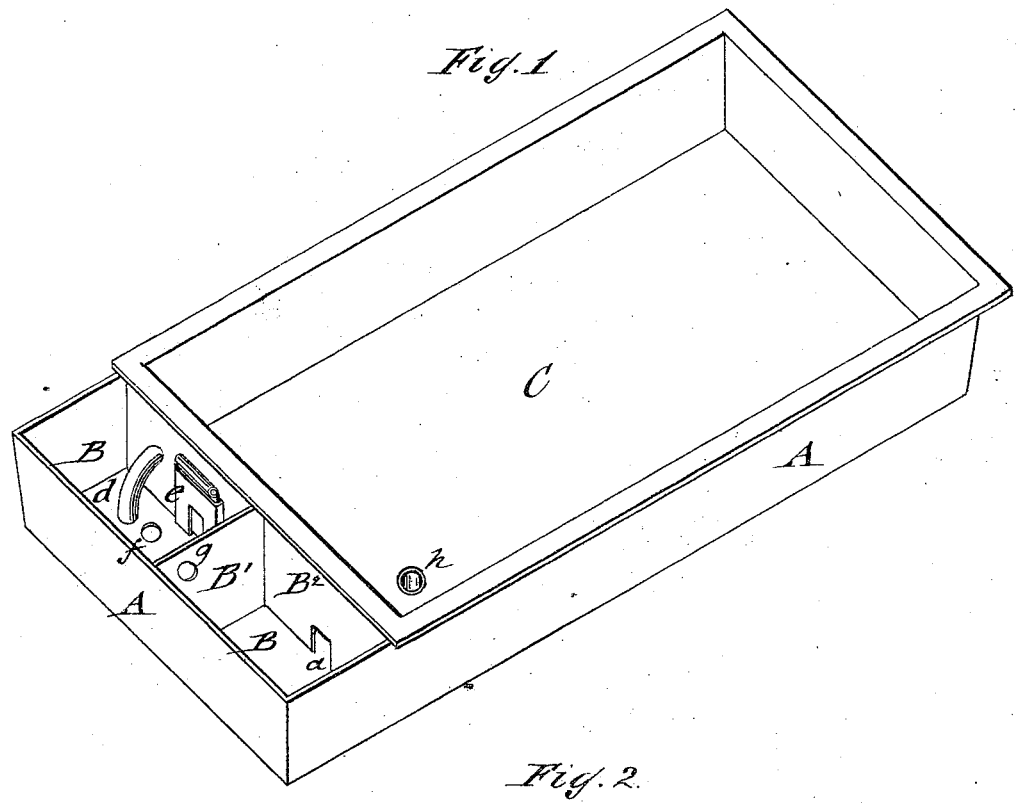
Figure 2:
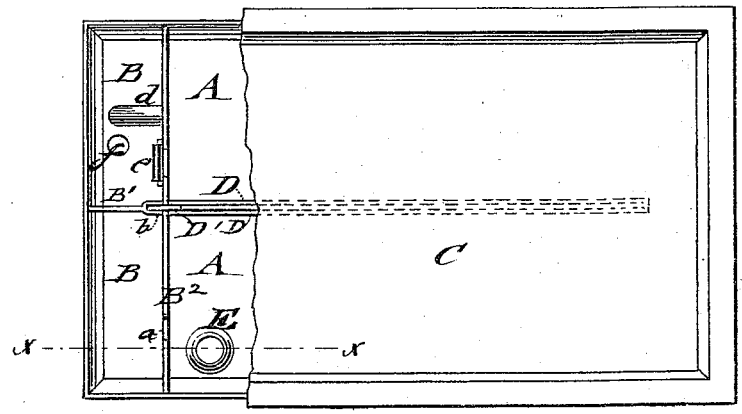

Be it known that I, ADDISON P. MYERS, of Prattsville, in the county of Greene and State of New York, have invented a new and Improved Milk-Cooler, of which the following is a specification:

In the accompanying drawing, Figure 1 represents a perspective view of my improved milk-cooler; Fig. 2, a top view; and Fig. 3, a vertical longitudinal section of the same on the line $x\ x$ of Fig. 2.

Similar letters of reference indicate corresponding parts.

My invention relates to improvements in milk-coolers, by which a regular flow of cold water around the pan is secured, a better support of the milk-pan produced, and a tight faucet-connection of pan and vat without leakage obtained.

The improvements consist in supporting the vat on a longitudinal rubber-lined partition-strip, and a vertical extension of the same at the partition-wall between water-chamber and vat, compelling the water to enter at one side of the partition and leave through a waste-pipe at the other. A rubber sleeve, with top collar or flange, fits snugly around the exit-pipe of pan, and into the exit-pipe of the vat, and connects the same without leakage of water.

In the drawing, A represents the tank or vat, which is provided, in the usual manner, at one end, with a water-chamber, B, separated into two sections by a partition, $B^1$. The water enters to the water-chamber at one side of the partition $B^1$, and passes through an opening, $a$, of the lateral partition-wall $B^2$, between water-chamber and vat, into the latter. The milk-pan C is supported on projecting top flanges in the vat, and prevented from bulging in the middle by a longitudinal partition-strip, D, that runs from the partition-wall $B^2$ to a point at suitable distance from the opposite end wall of the vat, so that the water is compelled to pass around the partition-strip D to the other section of the vat. The partition-strip D is provided with a projecting rubber lining, $D'$, which is continued in vertical direction at the main partition-wall $B^2$, and secured into a groove or socket, $b$, of the same, for the purpose of bearing tightly against the side and bottom of the pan, and compelling thereby the regular flow of water from the entrance aperture around the partition-strip to the exit side of the vat.

The water leaves the vat through a waste-pipe, $d$, which passes at suitable height through the partition-wall $B^2$, and the bottom of the exit section of the water-chamber, to the outside. A sliding gate, $e$, of the partition-wall $B^2$ in the exit section of the water-chamber, is used for drawing off the water from the exit section of the vat, and cleaning the same more readily, the water passing then out through a bottom hole, $f$, of the water-chamber, which serves, furthermore, for the purpose of conveying off any surplus water that passes through an overflow-hole, $g$, in the partition of the water-chamber from the entrance to the exit section.

Figure 3:
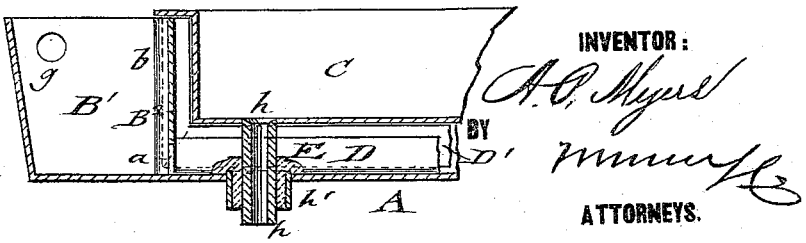

The faucet-connection between pan and vat is formed by a flexible sleeve, E, with projecting top collar or shoulder, that is tightly fitted around the exit-pipe $h$ of the pan, and into the pipe $h'$ of the vat, as shown in Fig. 3, so as to prevent effectually any leakage of water, while admitting the quick seating and removing of the pan. The water-supply around the milk pan is thus kept up without interruption, and a more convenient handling and cleaning of the pan and vat secured.

Having thus described my invention, I claim as new and desire to secure by Letters Patent—

1. In milk-coolers, the water tank or vat, provided with a longitudinal rubber-lined partition-strip, extending nearly the full length of the same, and vertically along the partition-wall of the water-chamber, in combination with the milk-pan seated thereon, for securing the regular flow of water from the entrance section to the exit section, substantially as and for the purpose set forth.

2. The combination of the flanged elastic sleeve or thimble E with the water-pan A, having a short tube, $h'$, and the milk-pan C, provided with a bottom exit-tube, $h$, as and for the purpose described.

ADDISON P. MYERS.

Witnesses:
JOHN A. ERKSON,
PATRICK EGAN.